United States Patent Office 2,849,866
Patented Sept. 2, 1958

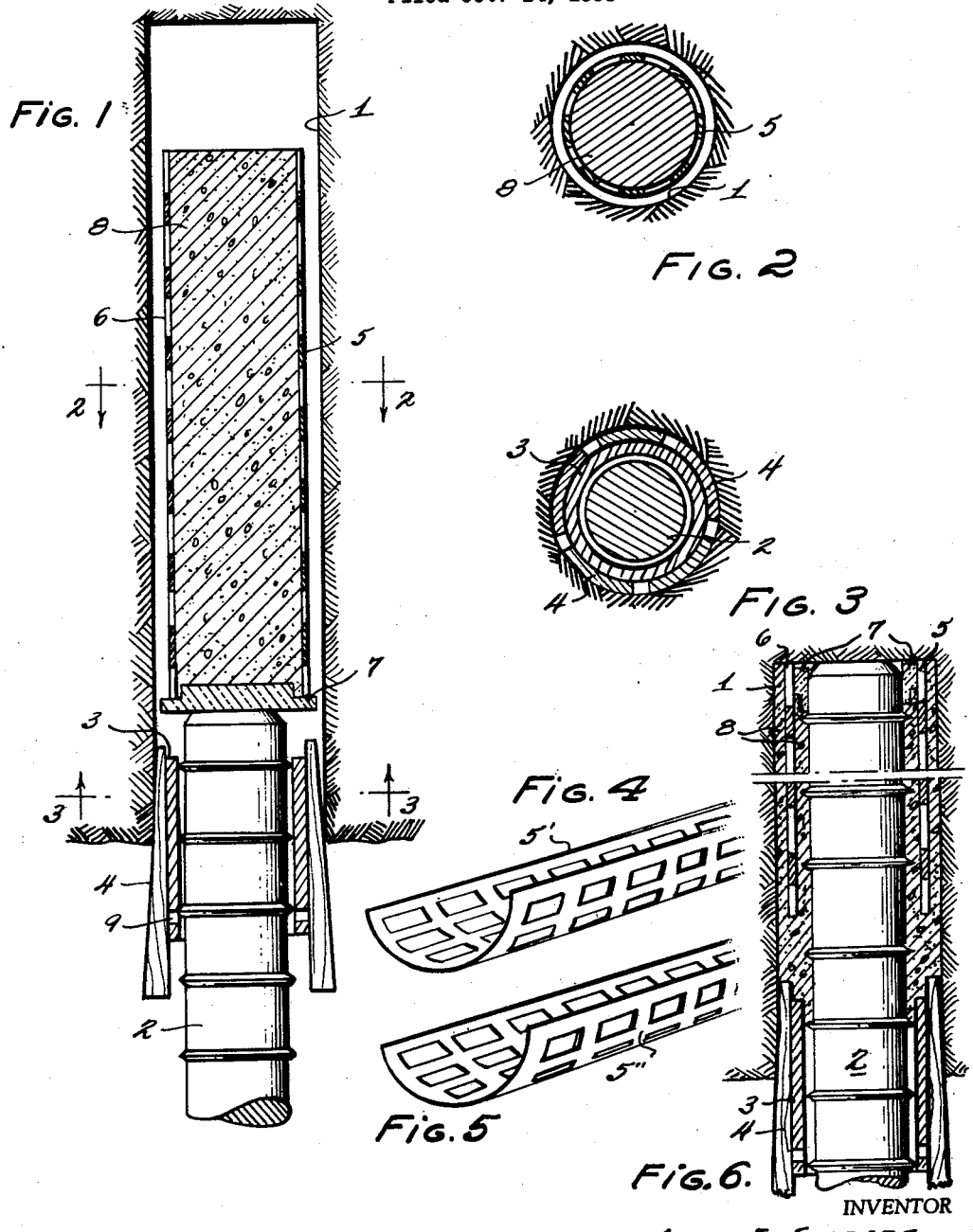

2,849,866
ROOF-BOLTING
Adolf Fredrik Flygare, Stockholm, and Alfred Ingevald Lundkvist, Karlskrona, Sweden
Application October 14, 1953, Serial No. 386,094
Claims priority, application Sweden October 18, 1952
5 Claims. (Cl. 61—45)

The present invention relates to a method and means for carrying out roof-bolting, i. e. for reinforcing a roof or a hanging wall in a mine, a shaft, or generally a cavity in the rock by means of bolts fastened in bore holes. The invention may be applied also in cases where it is desired to establish in the roof or on the wall a hold for a hook, a loop, or some other device which will be subjected to heavy loads and therefore must be safely anchored.

In roof-bolting it has been customary to use either bolts of the split-end-wedge type, which are anchored in the bores by driving the slotted inner end of the bolt over a wedge abutting against the bottom of the bore, or bolts of the cone-type, which are anchored in the rock by screwing an expansion device arranged at the inner end of the bolt over a cone-shaped core. The bolts, the length of which may amount to several meters, are threaded at the outer end. To this outer end a washer or plate is applied, whereupon a nut is placed on the threaded end of the bolt and firmly screwed towards the washer or plate which is in contact with the rock.

In this way the inner end of the bolt, which must be fastened to good rock, will carry the whole weight of the underlying portion of the rock which is often stratified and therefore weaker.

Since these bolts are anchored to the rock only at the inner ends and along a small portion only of their length, the safety depends to a high degree on the condition of the rock at this single anchorage-point. Furthermore, there is a certain clearance between the bolt and the bore along the greater portion of the length of the bolt, so that the latter may loosen when subjected to repeated side loads, which involves risk of accidents. Finally, those portions of the bolt, which are situated in the bore, are exposed to corrosion by acid water which might occur in the rock.

Recently it has been proposed to eliminate these drawbacks by fastening the bolts according to the so-called injection method. This method implies that, after a bolt of the split-end-wedge type or the cone-type has been anchored in the bore in the ordinary way, a thin cement sludge, sometimes with various ingredients added, is injected into the space between the bolt and the bore hole and by means of compressed air caused to fill up the greater portion of this space so that after the setting of the cement sludge, the bolt will be embedded in a solid cement-body in the bore.

However, with this injection method it is necessary to use a very wet or thin cement sludge which sets slowly and which is incapable of attaining a high final strength. Furthermore, the method requires a relatively complicated equipment and may be difficult to apply in case of highly water-bearing rocks. Moreover, if cracks are present in the rock, the risk increases that the thin cement sludge disappears through these cracks instead of filling up the bore hole around the bolt. Experiments carried out have shown that in the case of long vertical bolts the cement sludge very seldom fills the bore right to the upper end thereof and that a great portion of the cement material sets to a product of very poor quality.

The present invention relates to an improved method for fastening bolts in bores in the rock. According to this method a bore of adequate length is made in the rock, whereupon an apertured, sleeve-shaped member is inserted into the bore, said sleeve-shaped member being filled with a flowable and solidifying binder, such as cement mortar. The bolt to be fastened is then introduced into said sleeve-shaped member so that it acts like a plunge and forces the binder out through the apertures in the sleeve-shaped member and causes said binder to fill the space between the bore, the sleeve-shaped member and the bolt. After solidification of the binder the same will form a hard tubular body which connects the bolt with the rock substantially along the whole length of the bolt.

In this method it is possible to use as a binder a cement mortar of the most favorable composition from the point of view of strength, i. e. a cement mortar having a low content of water, which is viscous or plastic and which ensures that the space between the bore and bolt will be completely filled up so that, after the solidification or setting of the mortar, the bolt will be embedded substantially along its whole length in a concrete body of maximal strength.

The bolt may consist of a normal smooth steel rod but it is of course preferable to use a steel rod provided with circumferential flanges or ridges or the like. The sleeve-shaped apertured member containing the binder (for instance cement mortar) may be made of sheet metal, plastic or any other suitable material having the necessary strength. Preferably the same is divided in the longitudinal direction into two or more parts which parts may be bound together by means of a wire or the like after the cement mortar has been introduced into them. The consistency of the cement mortar and the dimensions of the apertures of the sleeve-shaped member should be so interrelated that the mortar does not flow out of the sleeve by itself but on the other hand may be forced out through the apertures therein by the bolt when the same is introduced into the sleeve. If the bore hole is vertical or sloping so that the binder has a tendency to flow out of the sleeve-shaped member, the lower end of said member may be closed by means of a washer. This washer should be made of a fragile material, e. g. cement material, glass or the like, so that it can be broken by means of the bolt when this is pushed into the sleeve-shaped member. After insertion of the sleeve-shaped member with the binder contained therein into the bore, a metal ring is preferably secured in the mouth of the bore. This ring may be fixed by means of wedges and serves to partly close the mouth of the bore. Moreover it guides and centers the bolt when the same is introduced into the sleeve-shaped member.

As a binder, cement mortar comes into consideration in the first place. If it is intended to subject the bolt to a load shortly after it has been fastened in the rock, a substance accelerating the setting of the mortar, such as gypsum, water-glass etc., may be added to the same. Other solidifying binders than cement mortar may of course also be used.

For the explanation of the invention reference is had to the accompanying drawing which shows a preferred embodiment of the means used in carrying out the method. Fig. 1 is a longitudinal sectional view through a bore in the roof of an excavation in the rock, in which bore an apertured, sleeve-shaped member containing a binder has been inserted. Figs. 2 and 3 are cross-sectional views taken on the lines 2—2 and 3—3, respectively, in Fig. 1. Figs. 4 and 5 are perspective views of the two parts of a preferred form of sleeve-shaped member. Fig. 6 is a view similar to Fig. 1 showing the bolt secured in the bore.

In Fig. 1 reference numeral 1 designates a bore in the roof and 2 the bolt to be fastened therein. In the mouth of the bore a ring 3 is fixed, which guides and centers the bolt. The ring 3 may be secured by means of wooden wedges 4 arranged around the ring between the same and the wall of the bore 1.

Reference numeral 5 designates a sleeve-shaped member of open-work or apertured structure, as shown at 6. The sleeve is open at the top. At the bottom the same is closed by means of a breakable washer 7. The sleeve 5 is filled with a binder 8, preferably consisting of cement mortar. After the sleeve has been inserted into the bore and the sealing ring 3 has been fixed in the mouth thereof the bolt 2 is introduced through the ring 3 and applied against the washer 7, whereupon the bolt is pushed upwards. When the sleeve-shaped member 5 has reached the bottom of the bore, the bolt 2 is forced through the washer 7 and enters into the sleeve as a plunger forcing the binder out through the apertures 6 so that the binder will completely fill the space between the bolt and the bore simultaneously as the main portion of the air and the excess of the binder are forced out of the mouth of the bore. During the period necessary for the solidification or setting of the binder 8 the bolt 2 may be kept in the desired position for instance by means of a wire passing through holes 9 in the projecting end of the ring 3 and wound around the bolt.

Fig. 4 and Fig. 5 show how the sleeve may consist of two halves, 5, 5" which can be put together after the cement mortar has been introduced into the same.

The main advantages of the new method are as follows:

The method does not necessitate any complicated equipment. The bolts, which may be ordinary smooth steel rods or steel rods provided with circumferential flanges or ridges, are cheap as compared with bolts of the split-end-wedge type and the cone type. The apertured sleeve-shaped member may be made at a low price.

The fastening of the bolts is simple and does not necessitate any special training.

The bolt will become embedded in concrete of good quality all along its length. Consequently it will be protected against corrosion and fastened to the rock without any clearance. The reinforcement of the rock obtained by means of the bolt therefore may be considered as permanent and free from maintenance-costs.

Since it is possible to use cement mortar with a relatively low content of water and having added thereto stone material (sand), a quick setting is obtained as well as a high final tensile strength. According to tests carried out this strength is equal to the yield limit of the steel when smooth steel bolts are used and exceeds the yield limit and approaches the ultimate stress of the steel when bolts provided with flanges or ridges are used.

All free rocks or strata along the whole length of the bolt will be connected to the same and will be thus mutually fixed to one another, which result is not obtained when the bolts are fastened in the rock according to the methods hitherto proposed.

The control is simple. Normally it should only be necessary to control the quality of the binder and to ascertain that some binder is forced out of the mouth of the bore when the bolt is inserted.

What we claim is:

1. In a method of roof-bolting particularly for rock tunnels and mines, the steps of making a bore in the rock, filling an apertured sleeve-shaped member with a semi-fluid and solidifying medium, a breakable washer closing the outer end of said sleeve-shaped member, inserting said sleeve-shaped member and medium and washer into said bore with said member having a smaller diameter than said bore, securing a ring in the mouth of the bore by means of wedges to prevent the sleeve-shaped member from being forced out of the bore and for guiding the bolt, the bolt having a smaller diameter than said sleeve-shaped member, and pushing the bolt to be fastened through said ring and into said sleeve-shaped member and its medium to force the medium out through the apertures in the sleeve-shaped member and cause the same to fill up the space between the sleeve-shaped member and the bore and to tightly surround the bolt so that after solidification of the medium the bolt will be fixedly connected substantially along its entire length to the rock by a hard tubular body.

2. In a method of roof-bolting particularly for rocks in tunnels and mines, the steps of making a bore in the rock, filling an apertured and sleeve-shaped member with a relatively viscous solidifying medium, inserting said member into the bore with said member having a smaller diameter than the bore, and pushing a bolt having a smaller diameter than said sleeve-shaped member into the latter in said bore to force the solidifying medium out through the apertures in the sleeve-shaped member and cause the same to fill up the spaces between the bolt and the sleeve-shaped member and between the latter and the bore so that after solidification of the said medium the bolt will be embedded in the solidifying medium and fixedly connected substantially along its whole length to the rock by a hard tubular body.

3. A method according to claim 2, in which the apertured and sleeve-shaped member is divided into two halves in the longitudinal direction to facilitate the introduction of the semi-fluid medium into the same, the said halves being bound together by means of a wire before inserting the sleeve into the bore hole.

4. In a method of roof-bolting particularly for rocks in tunnels and mines, the steps of making a bore in the rock, filling the two halves of a longitudinally cut and apertured sleeve-shaped member with relatively viscous cement mortar, putting the two halves together, inserting the filled sleeve-shaped member into the bore with said member having a smaller diameter than the bore, and pushing a bolt having a smaller diameter than said sleeve-shaped member into the latter in said bore to force the mortar out through the apertures in the sleeve-shaped member and cause the same to fill up the spaces between the bolt and the sleeve-shaped member and between the latter and the bore so that after setting and hardening of the mortar the bolt will be fixedly connected substantially along its whole length to the rock by a hard tubular body.

5. In a method of roof-bolting particularly for rocks in tunnels and mines, the steps of making a bore in the rock, filling the two halves of a longitudinally cut and apertured sleeve-shaped member with relatively viscous cement mortar, assembling the two halves, inserting the mortar filled sleeve-shaped member into the bore with said member having a smaller diameter than the bore, securing a separate ring in the mouth of the bore by means of wedges to prevent the sleeve-shaped member from being forced out of the bore, and pushing a bolt having a smaller diameter than said sleeve-shaped member into the latter in said bore to force the mortar out through the apertures in the sleeve-shaped member and cause the same to fill up the spaces between the bolt and the sleeve-shaped member and between the latter and the bore so that after setting and hardening of the mortar the bolt will be fixedly connected substantially along its whole length to the rock by a hard tubular body.

References Cited in the file of this patent

UNITED STATES PATENTS

| | | |
|---|---|---|
| Re. 16,062 | Tomkinson | May 5, 1925 |
| 1,345,663 | Cabell | July 6, 1920 |
| 1,798,468 | Hartzler et al. | Mar. 31, 1931 |
| 2,092,341 | De Vries | Sept. 7, 1937 |
| 2,442,113 | Beijl | May 25, 1948 |
| 2,570,003 | Palmer | Oct. 2, 1951 |
| 2,677,037 | Thomas | Jan. 26, 1954 |